(12) United States Patent
Schick

(10) Patent No.: US 7,038,793 B2
(45) Date of Patent: *May 2, 2006

(54) SENSOR DEVICE FOR PERFORMING RAPID OPTICAL MEASUREMENT OF DISTANCES ACCORDING TO THE CONFOCAL OPTICAL IMAGING PRINCIPLE

(75) Inventor: Anton Schick, Velden (DE)

(73) Assignee: Siemens Aktiengesellschaft, Munich (DE)

( * ) Notice: Subject to any disclaimer, the term of this patent is extended or adjusted under 35 U.S.C. 154(b) by 160 days.

This patent is subject to a terminal disclaimer.

(21) Appl. No.: 10/478,837

(22) PCT Filed: May 15, 2002

(86) PCT No.: PCT/DE02/01748

§ 371 (c)(1),
(2), (4) Date: Nov. 26, 2003

(87) PCT Pub. No.: WO02/097364

PCT Pub. Date: Dec. 5, 2002

(65) Prior Publication Data

US 2005/0002042 A1    Jan. 6, 2005

(51) Int. Cl.
*G01B 11/14* (2006.01)
*G01J 1/04* (2006.01)
(52) U.S. Cl. .............. 356/614; 356/609; 356/624; 250/227.11; 250/201.1; 250/251.1 A
(58) Field of Classification Search ........ 356/601–624, 356/399–400; 250/227.11, 201.1, 227.14, 250/221.3, 216
See application file for complete search history.

(56) References Cited

U.S. PATENT DOCUMENTS

| | | | | |
|---|---|---|---|---|
| 4,585,349 A | * | 4/1986 | Gross et al. | 356/624 |
| 4,670,649 A | * | 6/1987 | Senior et al. | 250/227.21 |
| 4,714,346 A | * | 12/1987 | Eichen et al. | 356/482 |
| 4,719,341 A | * | 1/1988 | Hoogenboom | 250/203.2 |

(Continued)

FOREIGN PATENT DOCUMENTS

DE            196908468         9/1997

(Continued)

*Primary Examiner*—Hwa (Andrew) Lee
*Assistant Examiner*—Sang H. Nguyen
(74) *Attorney, Agent, or Firm*—Harness, Dickey & Pierce P.L.C.

(57) ABSTRACT

A sensor device is for performing rapid optical measurement of distances according to the confocal optical imaging principle in order to determine distance values and/or height values of a surface. The sensor device includes a point-shaped light-emitting element that is arranged on an optical axis, a reflector, which is arranged perpendicular to the optical axis and which can be displaced along the optical axis, imaging optics centered with regard to the optical axis, and a point-shaped light-receiving element that is situated at the same location as the light-emitting element. The components of the sensor device are arranged in such a manner that: light emitted by the light-emitting element is reflected by the reflector; while the reflector is displaced, the imaging optics focus the light reflected by the reflector at least once onto the surface to be measured; the focussed light is at least partially backscattered by the surface to the measured; and, while the reflector is displaced, the imaging optics focus, via the reflector, the backscattered light at least once onto the light-receiving element.

32 Claims, 3 Drawing Sheets

U.S. PATENT DOCUMENTS

| | | | |
|---|---|---|---|
| 5,448,359 A * | 9/1995 | Schick et al. ............... 356/609 |
| 5,543,918 A | 8/1996 | Abraham et al. |
| 5,887,009 A * | 3/1999 | Mandella et al. ............. 372/6 |
| 5,917,600 A * | 6/1999 | Rongo et al. ............... 356/622 |
| 6,181,474 B1 * | 1/2001 | Ouderkirk et al. .......... 359/629 |
| 6,316,764 B1 * | 11/2001 | Heffner et al. ......... 250/227.11 |
| 6,882,768 B1 * | 4/2005 | Haas et al. .................. 385/16 |

FOREIGN PATENT DOCUMENTS

| | | |
|---|---|---|
| DE | 68928345 | 5/1998 |
| DE | 19837249 | 2/2000 |
| DE | 20016626 | 1/2001 |
| DE | 10034250 | 2/2002 |
| WO | WO 90/00754 | 1/1990 |
| WO | WO 93/11403 | 6/1993 |

* cited by examiner

SENSOR DEVICE FOR PERFORMING RAPID OPTICAL MEASUREMENT OF DISTANCES ACCORDING TO THE CONFOCAL OPTICAL IMAGING PRINCIPLE

This application is the national phase under 35 U.S.C. § 371 of PCT International Application No. PCT/DE02/01748 which has an International filing date of May 15, 2002, which designated the United States of America and which claims priority on German Patent Application number DE 101 25 885.2 filed May 28, 2001, the entire contents of which are hereby incorporated herein by reference.

FIELD OF THE INVENTION

The invention generally relates to a sensor device. Preferably, it relates to one for performing rapid optical measurement of distances and/or for determining distance values and/or height values of a surface. In particular, it relates to the measurement of three-dimensional surfaces.

BACKGROUND OF THE INVENTION

For assembly systems in the field of electronics manufacture, such as—for example—for automatic assembly systems for printed circuit boards, ever greater demands are being placed on the positional tolerances of the components due to the increasing miniaturization of components. The requirements in terms of assembly speed have likewise increased sharply in the last few years and will continue to increase still further in the future. These high expectations indicate that, in the future, assembly systems will require high-precision and rapid distance or height sensors as well as high-precision and rapid positional sensors for components. Such sensors will be used, for example, for checking the coplanarity of the terminal posts of the components. Distance or height sensors can also be used to control the distance between a component and the circuit substrate during the assembly process.

Until now, known devices for detecting height raster images including a multitude of three-dimensionally located points of object surfaces have essentially been based on the so-called triangulation process, in which a laser beam touches the surface of the object to be inspected. While the two planar location coordinates of a specific point on the surface area are known due to the current positioning of the laser beam, the height coordinate of the surface point currently to be measured is detected by at least one laterally positioned objective combined with a location-sensitive detector. Sequential illumination with the laser beam of the three-dimensional surface to be investigated thus enables the surface to be measured.

The resolution of optical distance sensors which use the triangulation procedure depends on the so-called triangulation angle. Since future miniaturization of components will also call for an improvement in the resolution of distance sensors, the triangulation angle in such optical distance sensors must be increased. However, this leads to a considerable increase in existing shadowing problems.

A further disadvantage of optical distance sensors based on the triangulation process is that the surfaces to be studied can have different optical diffusion factors. Precise distance measurements may only be possible for objects with surfaces that have an isotropic diffusion factor, i.e. a diffusion factor that is equally strong in all directions, for the laser beam as it falls on the surface. Such an isotropic diffusion factor is not usually guaranteed, particularly in the case of metallic reflective or even transparent surfaces.

A known method for the three-dimensional measurement of surface structures is based on the so-called confocal principle, in which a point-shaped light source, which is usually defined by an aperture plate, is imaged onto the surface of the object to be measured. The light backscattered by the surface is in turn imaged onto a virtually point-shaped detector, which is likewise usually defined by an aperture plate. The light falling on the detector is at maximum intensity when both the object level and the detector level are actually in the focal point of the respective lens. If the surface of the object to be investigated is outside the focal point, the measured beam is widened in front of the point-shaped detector and the measurable intensity decreases greatly.

A known sensor device for the optical measurement of distances according to the confocal principle is explained below with the help of FIG. 1. The sensor device 100 has a light source 101, a first aperture plate 102, a beam splitter 103, a second aperture plate 104, a light detector 105 and an objective 106. The first aperture plate 102 is arranged directly in front of the light source 101, so that the system comprising the light source 101 and the first aperture plate 102 functions as a point source of light, which has an effective light-emitting surface that corresponds to the cross-section of the opening in the first aperture plate 102. Correspondingly the second aperture plate 104 is arranged directly in front of the light detector 105. The light detector 105, the second aperture plate 104, the beam splitter 103, the objective 106 and the point that is currently being captured on the surface to be measured (not shown) lie on an axis which coincides with the optical axis of the objective 106.

The path of the beam in the sensor device 100 is explained below. The light emitted from the point source of light falls first on the beam splitter 103. This is positioned diagonally relative to the optical axis so that the light emitted from the point source, after being reflected off the beam splitter 103, is directed onto the objective 106, and is focused by this objective onto a focal point 107 which is located at least close to the surface to be measured. The light reflected back at least partially by the surface is in turn imaged onto the second aperture plate 104 by means of the objective 106. Only the light which is transmitted without further deflection by the beam splitter 103 is involved in this imaging process.

The two plates 102 and 104 are arranged confocally relative to the focal point of the objective 106, i.e. the distance between the second aperture plate 104 and the objective 106 is equal to the sum of the distances between the first aperture plate 102 and the beam splitter 103 and between the beam splitter 103 and the objective 106. For the optical imaging processes inside the sensor device 100, the aperture plate 102 is imaged onto the focal point 107 via reflection off the beam splitter 103 from the objective 106, and the focal point 107 is imaged onto the second aperture plate 104 by way of the objective 106.

The actual distance measurement takes place in that the entire sensor device 100 is displaced in direction z 108 relative to the surface to be measured (not shown). While the device is displaced, the light intensity measured by the light detector 105 is detected. The course 109 of the measured light intensity as a function of the distance between the sensor device 100 and the surface to be measured is drawn in the insertion 110.

A maximum level 111 appears precisely when the focal point 107 is lying directly on the surface to be measured. In other words, the maximum level 111 is achieved when the opening in the first aperture plate 102 is imaged onto the smallest possible area on the surface to be measured. In the confocal arrangement of the two aperture plates 102 and 104, the illuminated area on the surface to be measured (not shown) is imaged by way of the objective 106 onto the smallest possible area, which coincides with the opening in the second aperture plate 104. The distance from the corresponding point on the surface to be measured to the sensor device 100 can be determined from the course 109 of the light intensity, in particular from the precise position of the maximum level 111. An entire three-dimensional surface profile of an unknown structure is then determined by sequential distance measurements between the sensor device 100 and individual points on the surface to be measured.

According to the confocal principle the illumination and detection path are identical, i.e. the light falling on the surface to be measured and the light reflected by the surface to be measured run coaxially and shadowing phenomena can generally be disregarded.

Furthermore measurement of the distance by way of the sensor device 100 does not require the absolute value of the light intensity reflected back to be measured; the relative light intensity which is measured by the point-shaped light detector according to the displacement of the sensor device 100 in direction z 108 is sufficient. Thus any measurement of distance by the sensor device 100 is done almost without regard to the dispersal or reflection characteristics of the object surface to be measured. The use of a point-shaped light detector also has the effect that multiple reflections onto three-dimensional object surfaces do not lead to false measurements. A further important advantage of the confocal method is that it is highly accurate to sub-micrometers, which means that the accuracy requirements associated with the increasing miniaturization of components can easily be met.

One disadvantage of the sensor device 100 shown in FIG. 1 is that the entire sensor device 100 must be displaced relative to the surface to be measured in order to measure the distance. A further disadvantage is that several optical components must be used, and it has therefore not yet been possible, cost-effectively, to produce compact confocal sensors with small dimensions.

An optical distance sensor based on the confocal principle is known from WO 93/11403, and includes the following features: 1) the measuring beam is substantially larger than the lighting beam with regard to diameter, 2) the diameters of measuring beam and lighting beam are approximately equal at the point of measurement, whereby the lighting beam has a greater depth of focus than the measuring beam, and 3) a beam splitting unit with a number of beam splitters for dividing the measuring beam into a number of partial beams, with an approximately point-shaped photodetector arranged in each partial beam.

A further optical distance sensor based on the confocal principle is known from DE 19608468, with 1) a transmitting unit having a number of point-shaped light sources, which are imaged onto the surface of an object to be measured, 2) a receiving unit having a number of corresponding point-shaped light detectors in the same quantity, which are arranged confocally in the measurement region on the image side, whereby the point-shaped light sources and the corresponding point-shaped light detectors are arranged linearly in a plane which is orthogonal to the optical axis and generate a row of scanning points in a straight line on the surface of the object, 3) coaxial guidance of the illumination and measurement beams, and 4) a periodically variable optical path length between the receiving unit and the imaging optics.

SUMMARY OF THE INVENTION

An object of an embodiment of the invention is to provide a compact, high-resolution distance sensor which includes a high data rate and low sensitivity both with regard to the diffusion factor of the surface to be measured and also with regard to secondary light reflexes.

An object may be achieved in that a sensor device for performing rapid optical distance measurement according to the confocal imaging principle in order to determine distance values and/or height values of a surface, in particular for three-dimensional surface measurement, with a point-shaped light-emitting element arranged on an optical axis, a reflector which is arranged perpendicular to the optical axis and which can be displaced along the optical axis, imaging optics centered with regard to the optical axis and a point-shaped light-receiving element that is situated at the same location as the light-emitting element, whereby the light transmitted from the light-emitting element is reflected by the reflector. Further, while the reflector is displaced, the imaging optics focus the light reflected by the reflector at least once onto the surface to be measured, the focussed light is at least partially backscattered by the surface to be measured. Further, while the reflector is displaced, the imaging optics focus, via the reflector, the backscattered light at least once onto the light-receiving element.

Compared to conventional sensor devices for performing optical measurement of distances according to the confocal imaging principal, in the sensor device according to an embodiment of the invention, in particular, it is no longer necessary for the entire sensor device to be displaced relative to the surface to be measured; only the reflector arranged on the optical axis needs to be displaced. Thus only a relatively small mass needs to be displaced compared to the entire sensor device, so that the displacement can be done with high frequency, and therefore a high data rate is guaranteed.

According to one embodiment of the invention, the reflector is a plane mirror. Implementation of the reflector using a plane mirror has the advantage that the reflector can be produced at low cost. Furthermore, the reflector fashioned as a plane mirror has very small spatial dimensions and therefore also has a very small mass, which means that the reflector can be moved with very high frequency.

According to another embodiment of the invention, the reflector is displaced periodically. This enables the distance from a point on the surface to be measured to be measured several times in succession by the sensor device and this distance to be determined with particular accuracy by calculating the mean of several individual measurements.

According to a further embodiment of the invention, the reflector is displaced by way of an electromagnetic, piezoelectric and/or micromechanical capacitive drive mechanism. These forms of drive mechanism enable the reflector to be moved with high frequency, so that a particularly high data rate can be achieved by the distance sensor according to an embodiment of the invention.

According to a preferred embodiment of the invention, the imaging optics have a converging lens. In the simplest case the imaging optics consist of a single converging lens. This enables the imaging optics to be implemented in a simple and—in particular—economical manner.

According to another, particularly preferred embodiment of the invention, the light-emitting element and light-receiving element are implemented by way of one end of an optical fiber. This has the advantage that it enables the components of the sensor device to be installed in two different and spatially separate modules. This is particularly advantageous if the first module contains the light source, light detector and the electronic components of the sensor device, and the second module contains only those components of the sensor device that need to be close to the object to be studied according to the confocal imaging principle. Thus, the sensor device on the object side can be of particularly small construction.

According to a further, particularly preferred embodiment of the invention, the second end of the optical fiber is split into two partial ends, whereby the first partial end is optically coupled to the light source and the second partial end is optically coupled to the light detector. According to the invention, the splitting of the optical fiber into two partial ends is preferably performed by way of an optical fiber coupling element. This further, particularly preferred embodiment has the advantage that it is no longer necessary to adjust the light source and the light detector relative to the second end of the optical fiber.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
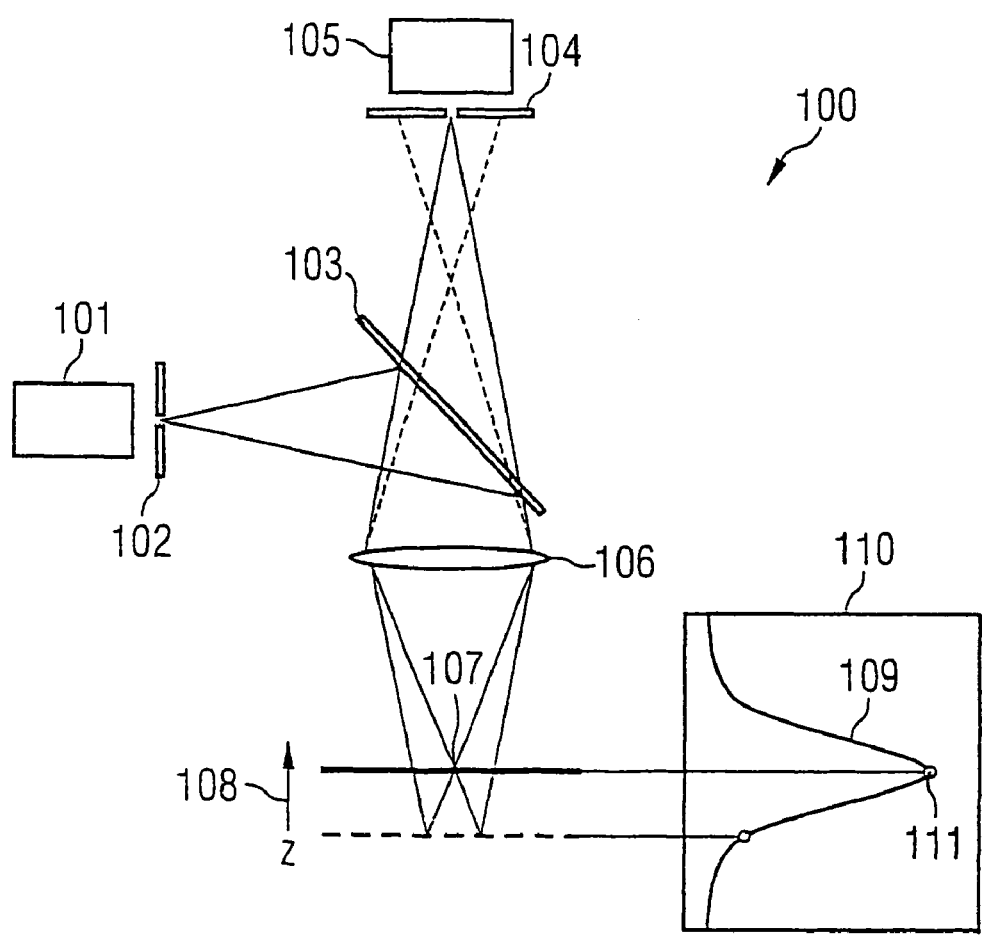
FIG. 1 shows an optical sensor device according to the confocal imaging principle according to the prior art.
Figure 2:
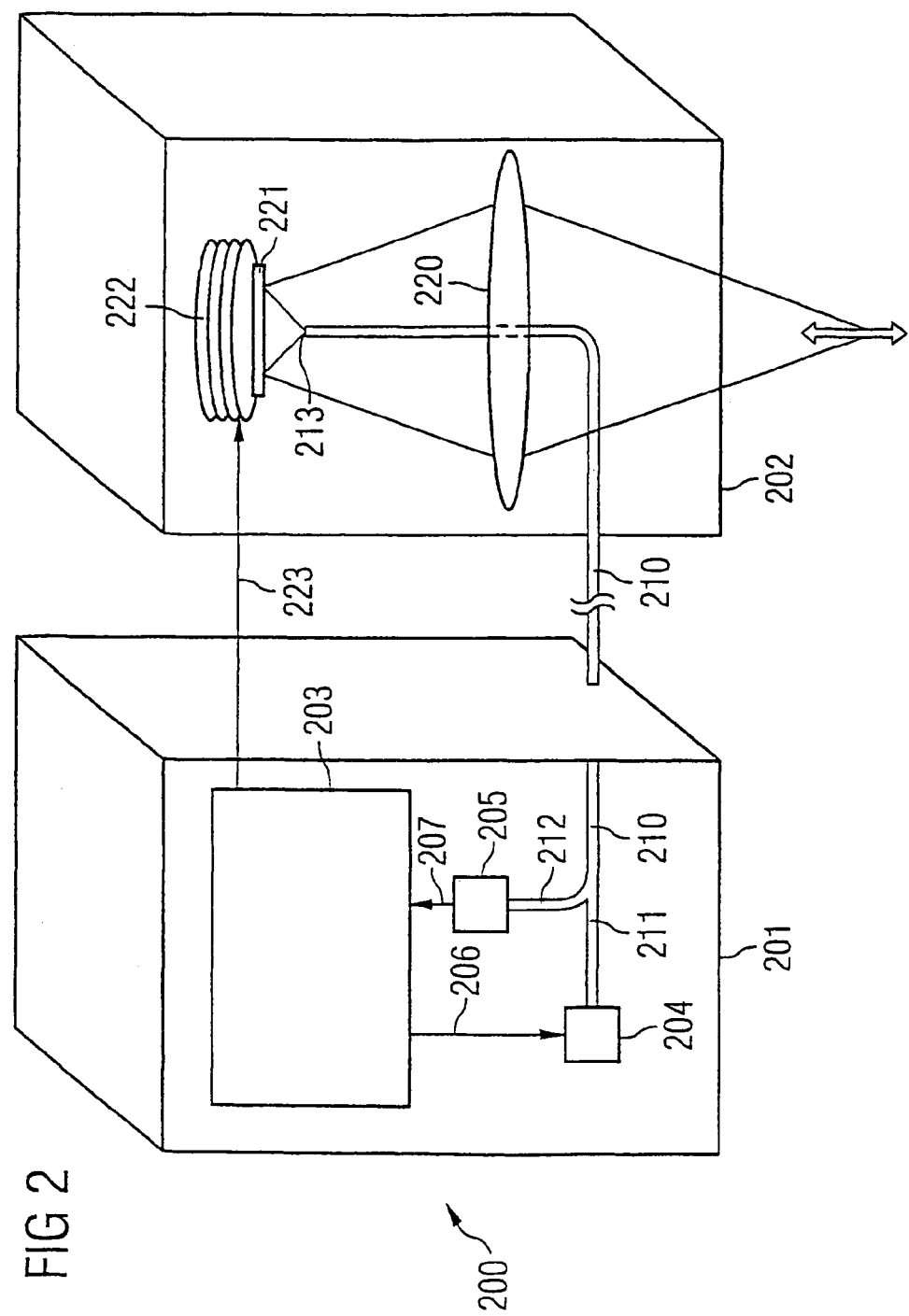
FIG. 2 shows an optical sensor device having a first and a second module according to the confocal imaging principle, according to an initial exemplary embodiment of the invention. In the second module, one end of the optical fiber is split into two partial ends, whereby the first partial end is optically coupled to the light source and the second partial end is optically coupled to the light detector.

FIG. 2 shows an optical sensor device 200 according to the confocal imaging principle according to an initial embodiment of the invention. The sensor device 200 has a first module 201 and a second module 202. The first module 201 contains an electronic module 203, a laser 204 which acts as the light source, and a photodiode 205 which acts as the light detector. The laser 204 is coupled to the electronic module 203 by means of an electrical connection cable 206. The photodiode 205 is coupled to the electronic module by way of the electrical connection cable 207.

The first module 201 is optically coupled to the second module 201 by way of an optical fiber 210. On the side turned toward the first module 201, the optical fiber 210 is split into a first partial end 211 and a second partial end 212. The first partial end 211 is optically coupled to the laser 204. The second partial end 212 is optically coupled to the photodiode 205. One end 213 of the optical fiber 210 arranged inside the second module 202 acts both as a point-shaped light source and as a point-shaped receiving surface.

The components of the second module 202 are described below. The second module 202 has a converging lens 220 and a movable reflector 221. The movable reflector 221 is arranged perpendicular to the optical axis of the converging lens 220. The reflector 221 is a plane mirror according to the first exemplary embodiment of the invention described here. This reflector is moved in an axial direction along the optical axis of the converging lens 220 by way of a drive mechanism 222.

The drive mechanism 222 is an electromagnetic drive mechanism, a piezoelectric drive mechanism or a micromechanical capacitive drive mechanism. The drive mechanism 222 is further coupled to the electronic module 203 via the control cable 223.

Between the reflector 221 and the converging lens 220, the end of the optical fiber 213 is arranged on the optical axis of the converging lens 220 such that the light coupled into the optical fiber 210 from the laser 204 in the first partial end 211 of the optical fiber 210 exits from the optical fiber 210 at the end of the optical fiber 213 and falls on the reflector 221. The end of the optical fiber 213 here represents almost a point source of light. The light emitted from the end of the optical fiber 213 is reflected by the reflector 221 and then focused by the converging lens 220.

The focused light falls on the surface to be measured (not shown) and is at least partially reflected by this surface. The reflected light is in turn imaged by the converging lens 220 and falls on the reflector 221, which directs the backscattered light to the end of the optical fiber 213, where the light reflected back into the optical fiber 210 is at least partially coupled in and the coupled in light is in turn at least partially captured, via the second partial end 212 of the optical fiber 210, by the photodiode 205. According to an embodiment of the invention the end of the optical fiber 213 acts as a point detector.

If the reflector 221 is now displaced in an axial direction by use of the drive mechanism 222, a shift in focus takes place in the object area, i.e. on the side of the converging lens 220 that is turned away from the reflector. At precisely the point where the focus falls, with a minimum cross-section, on the surface to be investigated, the photodiode 205 detects a maximum light intensity and delivers a maximum output signal. The measurement of the light intensity detected by the photodiode 205 as a function of the position of the reflector 221 enables the distance of the object from the converging lens 220 or from the entire second module 202 to be measured according to the confocal detector principle.

Since only a very few optical components are required inside the second module 202 according to the first exemplary embodiment of the invention described here, the second module 202 can be implemented with a highly compact design and spatially separate from the first module 210. According to the first exemplary embodiment of the invention described here, the module 202 has a height of approximately 6 cm, a width of approximately 5 cm and a depth also of approximately 5 cm.

The sensor device 200 described here according to the first exemplary embodiment of the invention has a height measurement range of approximately 2 mm. Thus, three-dimensional objects with a height difference of up to 2 mm can be measured. The height resolution of the sensor device 200 described here is approximately 2 µm. Since the reflector 221 can be implemented in the form of a small, light plane mirror, according to an embodiment of the invention only a very small mass needs to be displaced along the optical axis of the converging lens 220.

The displacement of the reflector 221 may be done advantageously by use of an electromagnetically driven oscillator. Such an oscillator, which has the functionality of a tuning fork, is already described in DE 196 08 468 C2.

Alternatively the reflector 221 may also be displaced by use of a plunger coil drive mechanism, which is used in commercial loudspeakers. The drive mechanism 222 may however be implemented to particularly good effect by way of a micromechanical solution, in which the oscillator is produced using the silicon etching technique.

The reflector 221 can be fashioned as a fixed component of the oscillator system. This solution, which is used in the first embodiment of the invention described here, permits an oscillation frequency of up to 10 kHz. Since the distance can be measured for each half period of the displacement of the reflector 221, up to 20,000 distance measurements per second are possible with the sensor device 200 described here according to the first exemplary embodiment of the invention.

Figure 3:
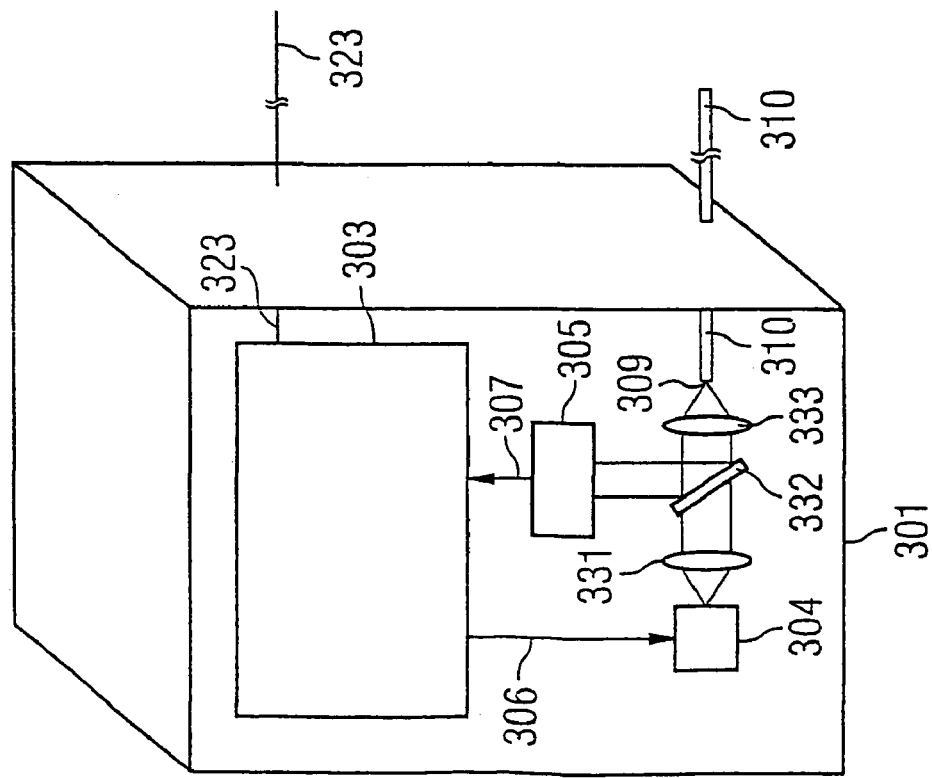
FIG. 3 shows the second module of an optical sensor device according to a second exemplary embodiment of the invention. The light source and light detector are coupled to the optical fiber according to the invention by means of a beam splitter.

A first module 301 according to a second exemplary embodiment of the invention is explained below with the help of FIG. 3. The first module 301 has an electronic module 303, a light diode 304 which acts as a light source, and a photodiode 305 which acts as a light detector. The light diode 304 is coupled to the electronic module 303 via an electrical connection cable 306. The photodiode 305 is coupled to the electronic module 303 via an electrical connection cable 307. The light diode 304 and the photodiode 305 are both optically coupled to the optical fiber 310 via a fiber launch device. The optical fiber 310 runs into a second module (not shown), which is constructed according to the second module according to the first exemplary embodiment of the invention (see FIG. 2).

Analogously to the first exemplary embodiment the electronic module 303 is coupled to the drive mechanism of the second module (not shown) via a control cable 323. The fiber launch device has a first converging lens 331, a beam splitter 332 and a second converging lens 333. The first converging lens 331, the beam splitter 332 and the second converging lens 333 are arranged such that the light emitted from the light diode 304 is focused onto the end of the optical fiber 309 and is thus coupled into the optical fiber 310. On the other hand the second converging lens 333 and the beam splitter 332 are arranged such that the light emitted from the end of the optical fiber 309 is captured by the photodiode 305.

In one variant of the first module of the second exemplary embodiment, a laser diode is used as the light source. The light from the laser diode is collimated, runs through a beam splitter and is coupled into a fiber by way of a focusing lens. The light falling on the fiber on the detection side is deflected by the beam splitter and focused onto a light detector by way of a further lens.

Figure 4:
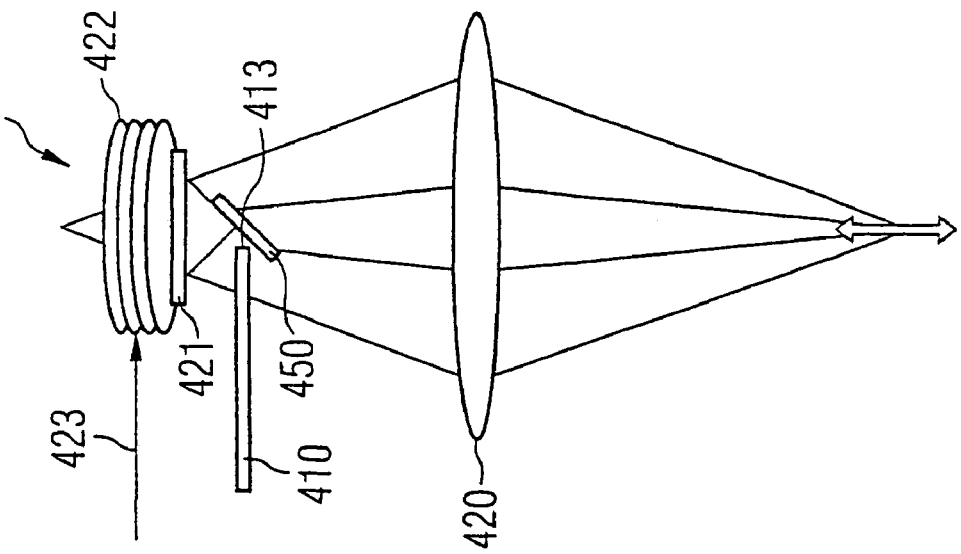
FIG. 4 shows the first module of an optical sensor device according to the confocal imaging principle according to a third exemplary embodiment of the invention. A deflection mirror is additionally arranged on the optical axis.

A second module 402 according to a third exemplary embodiment of the invention is explained below with the help of FIG. 4. The second module 402 has a deflection reflector 450, a reflector 421, a drive mechanism 422 and a converging lens 420. The reflector 421, which is displaced along the optical axis of the converging lens 420 by way of the drive mechanism 422, is positioned perpendicular to the optical axis of the converging lens 420. The deflection reflector 450, which is likewise located on the optical axis of the converging lens 420, is arranged at an angle to this axis between the reflector 421 and the converging lens 420. The drive mechanism 422 is electrically coupled to an electronic module (not shown) by way of a control cable 423.

The second module 402 is optically coupled to a first module (not shown) by way of an optical fiber. An appurtenant first module (not shown) is designed according to the third embodiment of the invention as the first module 201 shown in FIG. 2 or the first module 301 shown in FIG. 3.

The optical fiber 410 and the deflection reflector 450 are arranged relative to the optical axis of the converging lens 420 such that the light emitted from one end of the optical fiber 413 falls on the deflection reflector 450 and is reflected by this reflector such that the light reflected by the deflection reflector 450 falls on the movable reflector 421 in the shape of a cone that is coaxial to the optical axis of the converging lens 420. The light reflected by the movable reflector 421 is then imaged by the converging lens 420 onto the surface of the object to be measured.

At least part of the light falling on the surface to be measured is coaxially backscattered from that surface, and is then imaged onto the end of the optical fiber 413 by the converging lens 420 by way of a first reflection off the displaced reflector 421 and a second reflection off the deflection reflector 450. It is thus fed to the optical fiber 410.

As already explained in the description of FIG. 2, a shift in focus in the object area takes place along the optical axis of the converging lens 420 when the reflector 421 is displaced by the drive mechanism 422 in an axial direction parallel to he optical axis of the converging lens 420. The light intensity backscattered by the surface to be measured, and thus also the light intensity which is coupled into the optical fiber 410, is at its maximum precisely when the focus that is shifted along the optical axis of the converging lens 420 falls on the surface to be measured.

The distance to the surface to be measured from the second module 402 is then determined in that the light intensity at least partially backscattered by the surface, fed to the optical fiber 410 and measured by the light detector (not shown) which is optically coupled to the optical fiber 410, is measured as a function of the deflection of the displaced reflector 421.

At this point is should be mentioned that the deflection reflector 450 results in a shadowing of the light intensity near the optical axis of the converging lens 420. On the basis of the cylindrically symmetrical beam path inside the second module 402 between the deflection reflector 450 and the surface to be measured, the area shadowed by the diagonally positioned deflection reflector 450 contributes only slightly to the total light intensity. In addition the marginal beams contain the greatest proportion of the distance information. Thus the reduction in light intensity caused by shadowing by the deflection reflector 450 can be more or less disregarded.

The deflection reflector 450 is then particularly advantageous if the second module 402 is to be implemented inside a highly compact module and if, consequently, small bending radii in the optical fiber 410 are to be avoided.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Sensor device for performing optical measurement of distances according to the confocal imaging principle, comprising:
   a point-shaped light-emitting element, arranged on an optical axis;
   a reflector, arranged perpendicular to the optical axis and displaceable along the optical axis;
   imaging optics centered with regard to the optical axis; and
   a point-shaped light-receiving element, situated at the same location as the light-emitting element,
   whereby
      light emitted by the light-emitting element is adapted to be reflected by the reflector,
      when the reflector is displaced, the imaging optics are adapted to focus the light reflected by the reflector at least once onto a surface to be measured,
      the focussed light is adapted to be at least partially backscattered by the surface to be measured, and
      when the reflector is displaced, the imaging optics are adapted to focus, via the reflector, the backscattered light at least once onto the light-receiving element.

2. Sensor device according to claim 1, wherein the reflector is a plane mirror.

3. Sensor device according to claim 2, wherein the reflector is periodically displaceable.

4. Sensor device according to claim 1, wherein the reflector is periodically displaceable.

5. Sensor device according to claim 4, wherein the reflector is periodically displaceable by at least one of an electromagnetic, piezoelectric and micromechanical capacitive drive mechanism.

6. Sensor device according to claim 1, wherein the reflector is displaceable by at least one of an electromagnetic, piezoelectric and micromechanical capacitive drive mechanism.

7. Sensor device according to claim 1, wherein the imaging optics include a converging lens.

8. Sensor device according to claim 1, wherein the wavelength of the light is in at least one of the infrared, visible and ultraviolet spectral range.

9. Sensor device according to claim 1, wherein the light-emitting element and the light-receiving element are implemented by one end of an optical fiber.

10. Sensor device according to claim 9, wherein the second end of the optical fiber is optically coupled both to a light source and to a light detector.

11. Sensor device according to claim 10, wherein the second end of the optical fiber is split into two partial ends, whereby the first partial end is optically coupled to the light source and the second partial end is optically coupled to the light detector.

12. Sensor device according to claim 10, wherein the light source and light detector are optically coupled to the second end of the optical fiber by a fiber launch device having a beam splitter.

13. Sensor device according to claim 10, wherein the light source is at least one of a laser and a light diode.

14. Sensor device according to claim 10, wherein the light detector is at least one of a secondary electron multiplier, a photodiode, an avalanche photodiode and a multi-channel plate detector.

15. Sensor device according to claim 1, wherein the light emitted by the light-emitting element and the light received by the light-receiving element are additionally displaceable via a deflection reflector arranged on the optical axis.

16. Sensor device according to claim 15, wherein the deflection reflector is a plane mirror.

17. Sensor device according to claim 16, wherein the deflection reflector is oriented at a fixed angle of 45° to the optical axis.

18. Sensor device according to claim 17, wherein the second end of the optical fiber is optically coupled both to a light source and to a light detector.

19. Sensor device according to claim 18, wherein the second end of the optical fiber is split into two partial ends, whereby the first partial end is optically coupled to the light source and the second partial end is optically coupled to the light detector.

20. Sensor device according to claim 18, wherein the light source and light detector are optically coupled to the second end of the optical fiber by a fiber launch device having a beam splitter.

21. Sensor device according to claim 15, wherein the deflection reflector is oriented at a fixed angle of 45° to the optical axis.

22. Sensor device according to claim 1, wherein the sensor device is for performing optical measurement of distances in order to determine at least one of distance and height values of a surface.

23. Sensor device according to claim 1, wherein the sensor device is for performing measurement of three-dimensional surfaces.

24. Sensor device for performing optical measurement of distances according to the confocal imaging principle, comprising:
   means, displaceable along an optical axis, for reflecting light emitted by a light-emitting element;
   means for, when the means for reflecting is displaced, focusing the reflected light at least once onto a surface to be measured; and
   means for at least partially backscattering the focussed light by the surface to be measured, wherein when the means for reflecting is displaced, the means for focusing, via the means for reflecting, focuses the backscattered light at least once onto a light-receiving element situated at the same location as the light-emitting element.

25. Sensor device according to claim 24, wherein the means for reflecting includes a plane mirror.

26. Sensor device according to claim 24, wherein the means for reflecting is periodically displaceable.

27. Sensor device according to claim 24, wherein the means for reflecting is displaceable by at least one of an electromagnetic, piezoelectric and micromechanical capacitive drive mechanism.

28. Sensor device for performing optical measurement of distances according to the confocal imaging principle, comprising:
   a light-emitting element, arranged on an optical axis;
   a reflector, displaceable along the optical axis;
   imaging optics; and
   a light-receiving element, situated at the same location as the light-emitting element, whereby
      light emitted by the light-emitting element is adapted to be reflected by the reflector,
      when the reflector is displaced, the imaging optics are adapted to focus the light reflected by the reflector at least once onto a surface to be measured, the focussed light is adapted to be at least partially backscattered by the surface to be measured, and when the reflector is displaced, the imaging optics are adapted to focus, via the reflector, the backscattered light at least once onto the light-receiving element.

29. Sensor device according to claim 28, wherein the reflector is a plane mirror.

30. Sensor device according to claim 28, wherein the reflector is periodically displaceable.

31. Sensor device according to claim 28, wherein the reflector is displaceable by at least one of an electromagnetic, piezoelectric and micromechanical capacitive drive mechanism.

32. A method for performing optical measurement of distances according to the confocal imaging principle, comprising:
    reflecting light emitted by a light-emitting element, via a device displaceable along an optical axis;
    focusing, when the reflecting device is displaced, the reflected light at least once onto a surface to be measured; and
    at least partially backscattering the focussed light by the surface to be measured; and
    focusing via the reflecting device, when the device for reflecting is displaced, the backscattered light at least once onto a light-receiving element situated at the same location as the light-emitting element.

* * * * *